United States Patent
Donnici et al.

(10) Patent No.: US 10,679,391 B1
(45) Date of Patent: Jun. 9, 2020

(54) MOBILE PHONE NOTIFICATION FORMAT ADAPTATION

(71) Applicant: Sprint Communications Company L.P., Overland Park, KS (US)

(72) Inventors: Gina R. Donnici, Lee's Summit, MO (US); Matthew Habiger, Kansas City, KS (US); Jared K. Harpole, Overland Park, KS (US); Dillon M. Hughes, Kansas City, MO (US); John Walter Swiecicki, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 282 days.

(21) Appl. No.: 15/867,694

(22) Filed: Jan. 11, 2018

(51) Int. Cl.
*G06T 11/60* (2006.01)
*H04W 84/04* (2009.01)

(52) U.S. Cl.
CPC .......... *G06T 11/60* (2013.01); *G06T 2200/24* (2013.01); *H04W 84/042* (2013.01)

(58) Field of Classification Search
CPC .............................. G06T 11/60; G06F 3/0484
USPC ....................................................... 715/745
See application file for complete search history.

(56) References Cited

U.S. PATENT DOCUMENTS

| | | | | |
|---|---|---|---|---|
| 10,410,321 | B2* | 9/2019 | Ilic | G06T 11/60 |
| 10,430,986 | B2* | 10/2019 | Frieder | G06K 9/6221 |
| 2008/0028319 | A1* | 1/2008 | Cox | G06F 9/451 |
| | | | | 715/745 |
| 2014/0289642 | A1* | 9/2014 | Prasad | G06F 3/048 |
| | | | | 715/745 |
| 2015/0128058 | A1* | 5/2015 | Anajwala | H04L 67/22 |
| | | | | 715/739 |
| 2015/0317038 | A1* | 11/2015 | Mianji | G06F 3/167 |
| | | | | 715/745 |
| 2016/0350953 | A1* | 12/2016 | Mittelstaedt | G06T 11/60 |
| 2017/0132821 | A1* | 5/2017 | Valliani | G06F 17/241 |
| 2018/0350121 | A1* | 12/2018 | Samuel | G06T 11/60 |

\* cited by examiner

*Primary Examiner* — William D Titcomb

(57) ABSTRACT

A mobile communication device with self-adapting notification presentation. The device comprises a processor, a cellular radio transceiver, a non-transitory memory, a first mobile application stored in the non-transitory memory that, when executed by the processor, receives a first notification bundle, where the first notification bundle comprises a first notification in a plurality of different formats, and presents the first notification in one of the different formats based on a first format preference, and a notification presentation format adaptation application stored in the non-transitory memory that, when executed by the processor, analyzes responses to notifications presented by the first mobile application, determines a first optimum notification format based on the analysis, and configures the first optimum notification format as the first format preference in the first mobile application.

11 Claims, 7 Drawing Sheets

MOBILE PHONE NOTIFICATION FORMAT ADAPTATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are very widely used in the United States. These mobile communication applications provide voice communication and data communication services. Many mobile communication devices support downloading and installing mobile applications, such as gaming applications, special interest applications, streaming media applications, and other applications.

SUMMARY

In an embodiment, a mobile communication device with self-adapting notification presentation is disclosed. The mobile communication device comprises a processor, a cellular radio transceiver, a non-transitory memory, a first mobile application stored in the non-transitory memory, a second mobile application stored in the non-transitory memory, and a notification presentation format adaptation application stored in the non-transitory memory. When executed by the processor, the first mobile application receives a first notification bundle, where the first notification bundle comprises a first notification in a plurality of different formats, and presents the first notification in one of the different formats based on a first format preference. When executed by the processor, the second mobile application receives a second notification bundle, where the second notification bundle comprises a second notification in a plurality of different formats, and presents the second notification in one of the different formats based on a second format preference. When executed by the processor, the notification presentation format adaptation application analyzes responses to notifications presented by the first mobile application, determines a first optimum notification format based on the analysis, and configures the first optimum notification format as the first format preference in the first mobile application. The notification presentation format adaptation application further analyzes responses to notifications presented by the second mobile application, determines a second optimum notification format based on the analysis, and configures the second optimum notification format as the second format preference in the second mobile application.

In another embodiment, a method of adapting notification presentation formats in mobile applications on mobile communication a mobile communication device is disclosed. The method comprises presenting notifications by a mobile application executing on a mobile communication device, where the notifications are presented in a plurality of different formats during a first training period, monitoring responses to presentation of the notifications during the first training period by a notification presentation format adaptation application executing on the mobile communication device, analyzing the responses by the adaptation application during the first training period, configuring a first format preference into the mobile application by the adaptation application, receiving a first notification bundle by the mobile application, where the first notification bundle comprises a first notification in a plurality of different formats, and presenting the first notification in one of the different formats by the mobile application, where the format presented is selected by the mobile application based on the first format preference. The method further comprises presenting notifications by the mobile application, where the notifications are presented in a plurality of different formats during a second training period, monitoring responses to presentation of the notifications during the second training period by the adaptation application, analyzing the responses by the adaptation application during the second training period, configuring a second format preference into the mobile application by the adaptation application, receiving a second notification bundle by the mobile application, where the second notification bundle comprises a second notification in a plurality of different formats, and presenting the second notification in one of the different formats by the mobile application, where the format presented is selected by the mobile application based on the second format preference.

In yet another embodiment, a method of adapting notification presentation formats in mobile applications on mobile communication a mobile communication device is disclosed. The method comprises presenting notifications by a mobile application executing on a mobile communication device, where the notifications are presented in a plurality of different formats during a first training period, monitoring responses to presentation of the notifications during the first training period by a notification presentation format adaptation application executing on the mobile communication device, saving the responses in a log, analyzing the responses by the adaptation application during the first training period, and configuring a first format preference into the mobile application by the adaptation application. The method further comprises receiving a first notification bundle by the mobile application, where the first notification bundle comprises a first notification in a plurality of different formats, presenting the first notification in one of the different formats by the mobile application, where the format presented is selected by the mobile application based on the first format preference, and transmitting the log via the cellular radio transceiver to a server computer, whereby an application on the server computer aggregates logs of responses to different formats of notifications from a plurality of mobile communication devices for use by third parties associated with the notifications.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
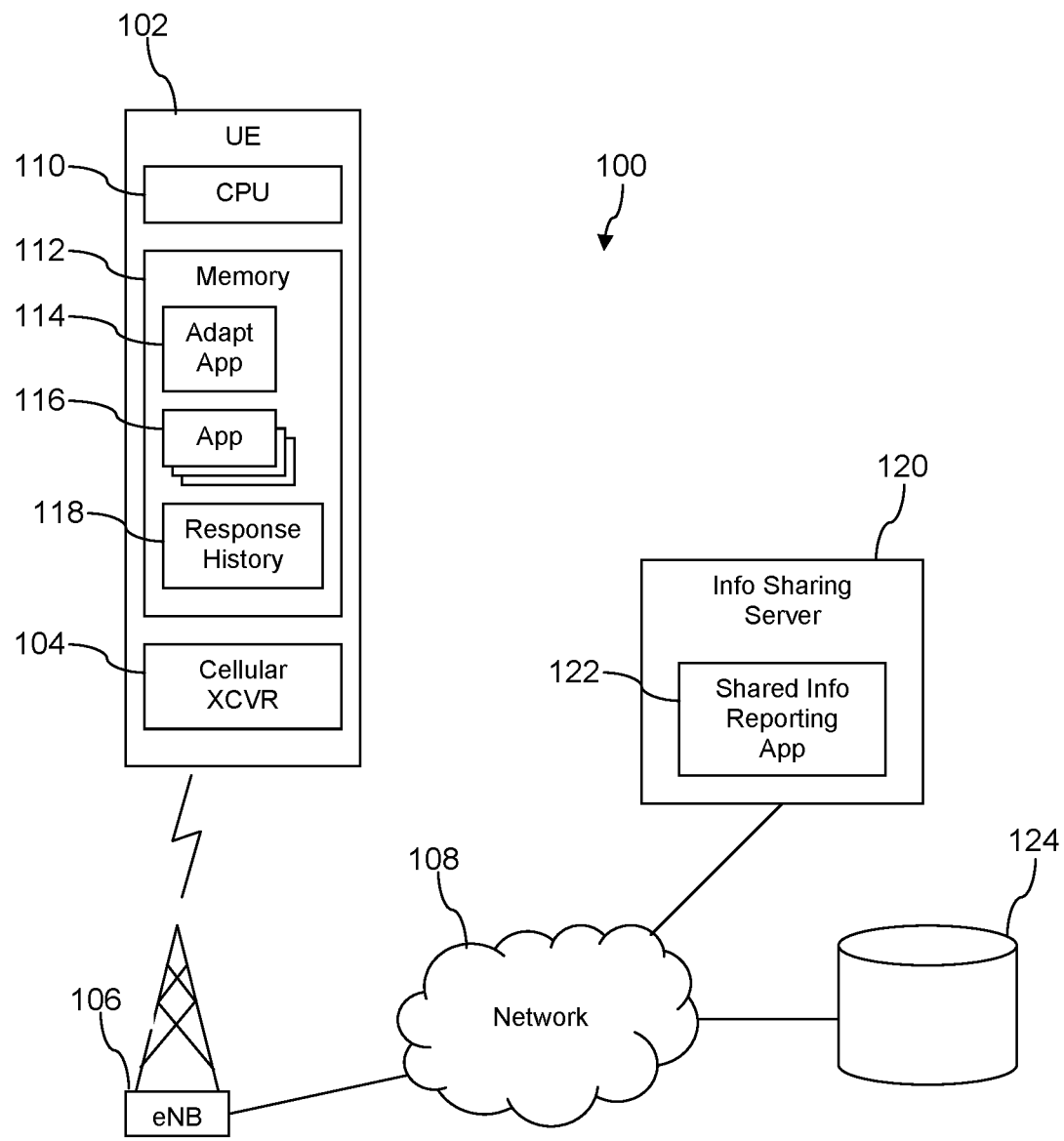
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Different people like to see content displayed in their mobile applications on mobile communication devices in different formats. Often, the same person likes to see content displayed in different mobile applications on his or her phone in different formats. The present disclosure teaches analyzing a user's response to content presented in different formats in different mobile applications on a mobile communication device and automatically configuring each of those mobile applications to present notifications according to the format found to be preferred by that user. To support this functionality, notifications are sent to the mobile communication device in a bundle comprising the same general notification content in a variety of different formats, whereby the mobile application can select to present the notification content in the format that has been configured into the mobile application as the preferred format, based on the analysis described above.

In an embodiment, a notification presentation format adaptation application executes on the mobile communication device that monitors user responses to notifications and the format in which the notifications are presented. During a training mode of operation, a mobile application may present a series of notification content selected from notification bundles received by the mobile application in different formats. The adaptation application monitors the user responses to the notifications presented in the different formats and analyzes those responses to determine which format is associated with the best response (e.g., the highest rate of user click through, the fastest user click through). The adaptation application then sets a configuration parameter of the mobile application that causes the notification content in a notification bundle to be presented in the format associated with the configuration value. Because a user may exhibit different responses to notification content formats in different mobile applications (e.g., a different response in a web browser application versus a game application versus a streaming music application), the adaptation application analyzes user responses to notification formats separately or independently for different mobile applications, determines format preferences for each of a plurality of mobile applications, and configures each mobile application to present notification content according to the preferred format for each mobile application. Said in other words, the adaptation application may configure different format preferences into different mobile applications. It is noted that the adaptation application adapts presentation formats on different devices belonging to different users according to the preferences of each different user. By configuring mobile applications to present notifications in a preferred format, greater user satisfaction can be promoted and more dynamic distribution of mobile applications to devices may be promoted.

The notification presentation format adaptation application can occasionally or periodically repeat the training mode of operation and reanalyze user responses to identify format presentation preferences in different mobile applications. User format presentation format preferences may change over time, and retraining and readapting format preferences can promote tracking evolving user format preferences. New presentation formats may become available, and retraining and readapting format preferences gives the new format an opportunity to be compared with the earlier deployed formats. A user may grow tired or bored with a presentation format, and retraining and readapting format preferences can promote refreshing the experience the user has of content presentation. Additionally, retraining and readapting may be desirable prior to or during special periods of time, for example during a high shopping period. This special period of time may be associated with different content distribution by content suppliers during the special period of time, and the users may have different content presentation format preferences for this different content distribution. For example, the content distribution during a Thanksgiving holiday period may be heavily laden with food related content and kitchen utensil related content, and users may have a different presentation format preference for such content than for travel related content (if the previous training period was during summer, the content distribution at that time may have been heavily laden with content related to summer vacation travel destinations).

In an embodiment, the adaptation application logs user responses to notification content formats, aggregates those logs into a report, and transmits the report to a server computer. The server computer may analyze the reports from a plurality of mobile communication devices and summarize statistics of user responses to notification content formats. These summary statistics may be sold or otherwise provided to third party sources of notification content to promote their tuning their notifications to the community of mobile communication device users. These summary statistics may be used by original equipment manufacturers for setting default content presentation formats on mobile communication devices. These summary statistics may be used by mobile application developers to configure default content presentation formats in their mobile applications. It is noted that in this way the learning extracted from mobile communication devices having the notification presentation format adaptation application can be leveraged or shared to other mobile communication devices that may not have the notification presentation format adaptation application installed. In an embodiment, the summary statistics may be partitioned along broad user categories, such as broad age categories, such as gender categories, and mobile applications could embed logic for self-configuring content presentation format preferences according to the partitioned summary statistics and based on learning the profile of the user.

Turning now to FIG. 1, a system 100 is described. In an embodiment, the system 100 comprises a mobile communication device (user equipment—UE) 102 having a cellular radio transceiver 104 that may establish a wireless communication link with a cell site 106 which in turn provides a communication link to a network 108. The mobile communication device 102 may be a mobile phone, a smart phone, a personal digital assistant (PDA), a wearable computer, a headset computer, a laptop computer, a tablet computer, or a notebook computer. The network may comprise one or more public networks, one or more private networks, or a combination thereof. The cell site 106 may provide a wireless communication link to the cellular radio transceiver 104 according to a long term evolution (LTE), a code division multiple access (CDMA), a global system for mobile communications (GSM), a worldwide interoperability for microwave access (WiMAX), or other wireless communication protocol. The cell site 106 may be an enhanced node B (eNB), a base transceiver station (BTS), a picocell, or other wireless access point.

The mobile communication device 102 further comprises a processor 110, a memory 112 that stores a notification presentation format adaptation application 114 and a mobile application 116. In an embodiment, the memory 112 may comprise two or more mobile applications 116. The notification presentation format adaptation application 114 may create a user notification response history 118 that records user responses to notifications presented in the mobile applications 116. Alternatively, the mobile applications 116 may capture and log user responses in the user notification response history 118. The mobile application 116 may be built with a software development kit (SDK) that embeds these functions of monitoring and logging of user responses to notifications into the mobile application 116. The mobile application 116 may be any of a wide variety of applications or computer programs executable on a mobile communication device such as device 102. The mobile application 116 may be a gaming application, an Internet browser application, a navigation application, a social networking application, a special interest application (e.g., a cooking application, a bird watching application, a parkour application, etc.), or other kind of application. The mobile application 116 may occasionally request, receive, and present a notification in a display (not shown) of the device 102.

The present disclosure teaches receiving a notification bundle that comprises a plurality of differently formatted notifications. Each of the differently formatted notifications may be said to contain the same general content—for example information about a new mobile application—but each different formatted notification may be configured to be presented differently on the display of the mobile communication device 102. For example, a first format may be a static image that comprises a picture with text overlaid on the picture; a second format may be a low-quality video with some text overlaid on the pictures; and a third format may be a high-quality video with audio presented via a speaker of the device 102. Different formats also may be associated with different sized images presented on the display of the device 102. Different formats may be associated with presentation of notification at different locations on the display, for example at top of the display, along a right side of the display, along a left side of the display, at a bottom of the display. By bundling a plurality of differently formatted notifications associated with the same general content in a notification bundle and sending this notification bundle to the mobile communication device 102, the mobile application 116 may be able to select one of the differently formatted notifications based on a preferred notification format parameter configured into the mobile application 116.

In a training mode of operation, the mobile application 116 may ignore the preferred notification format parameter configured into it and present a series of different notifications in different formats, for example employing a round-robin approach to selecting different formats. Thus, in a training mode of operation, the mobile application 116 may receive a first notification bundle and select and present a specifically formatted notification from that first notification bundle having a first format; may receive a second notification bundle and select and present a specifically formatted notification from that second notification bundle having a second format different from the first format; may receive a third notification bundle and select and present a specifically formatted notification from that third notification bundle having a third format different from the first and second formats; and so on. In an embodiment, the notification presentation format adaptation application 114 may place the mobile application 116 into the training mode of operation and restore the mobile application 116 from the training mode of operation to a normal mode of operation.

The notification presentation format adaptation application 114 (alternatively referred to in a shortened form as the adaptation application 114 or as the format adaptation application 114) may monitor the user reactions to notifications presented by the mobile application 116 while it is operating in the training mode of operation and store those user reactions in the response history 118. Alternatively, as described above, instructions embedded in the mobile applications 116 by an SDK may monitor and store user reactions in the response history 118. After a sufficient number of user responses have accumulated in the response history 118 or after a pre-defined period of time, the adaptation application 114 may change the state of the mobile application 116 from the training mode of operation to a normal mode of operation. The adaptation application 114 may analyze the user responses associated with different notification presentation formats in the specific mobile application 116 to determine which notification presentation format elicits the best and/or most intense user response. The user response can be determined based on whether the user has clicked on the notification and/or whether the user has performed further interactions based on the notification, for example by downloading and installing a new mobile application on the device 102 as a result of the notification being presented on the display of the device 102. The intensity of the user response can be further determined based on a time span between presentation of the notification content and the user interaction with the content. For example, faster response may be deemed a more intense response than a slower response, other things being equal.

Having determined the best notification format for a specific mobile application 116, the adaptation application 114 may set a preferred format parameter of the mobile application 116. The adaptation application 114 may perform training and analysis of user responses for each of a plurality of different mobile applications 116, configuring a potentially different preferred format into each of the different mobile applications 116. The adaptation application 114 may occasionally repeat the training/adaptation cycle to repeat determination of the preferred format for an application, for example, repeating training and adaptation of the preferred format parameter every three months, every six months, or once per year. The adaptation application 114 may repeat the training/adaptation cycle after a predefined number of notification bundles have been received by the subject mobile application 116, for example after receiving 20 notification bundles, after receiving 50 notification bundles, after receiving 100 notification bundles, or after receiving some other predefined number of notification bundles. In this way the adaptation application 114 may keep the mobile applications 116 adapted to the notification formats preferred by the user of the device as the preferences of the user shifts over time, as user preferences sometimes do.

In an embodiment, the notification presentation format adaptation application 114 reports some of the statistical findings it develops while determining a preferred format parameter for the applications 114 to an information sharing server 120 to store in a user response data store 124 or directly to the user response data store 124. Over time the user response data store 124 accumulates statistical findings of a great many adaptation applications 114, thereby accumulating data that indicates the notification format preferences of a great number of mobile device users. A shared report information reporting application 122 that executes on the information sharing server 120 may analyze the contents of the user response data store 124, generate a summary report on those contents, and share the summary report with one or more third parties that provide the notification bundles. These third parties may use the summary reports to modify their content and their notification bundles. For example, a third party that has not previously invested effort in developing notifications in a specific format may begin doing so when it learns that other notification providers have realized great success—as evidenced by the user responses reflected in the summary report—with that specific format.

Figure 2A:
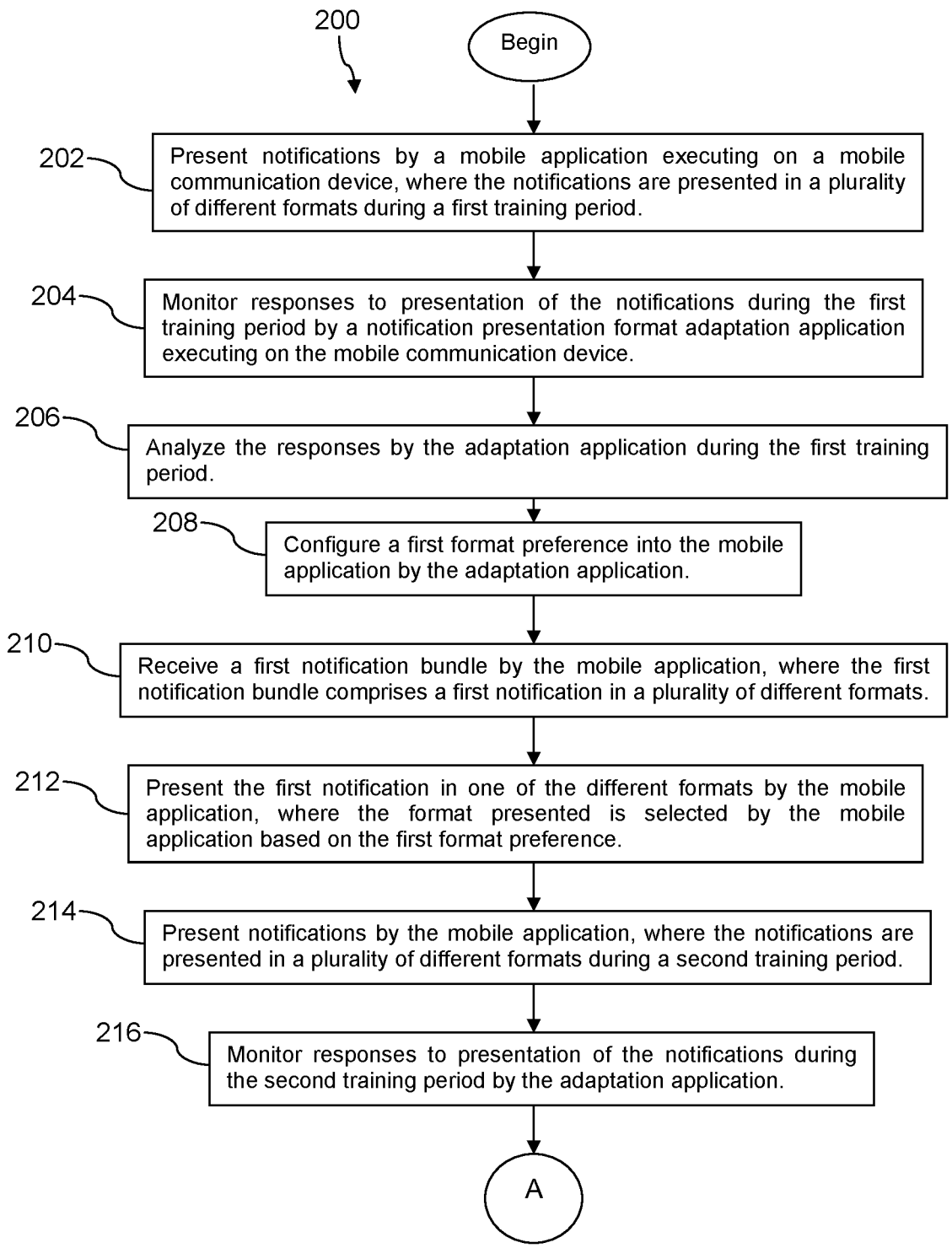
FIG. 2A and FIG. 2B is a flow chart of a method according to an embodiment of the disclosure.
Figure 2B:
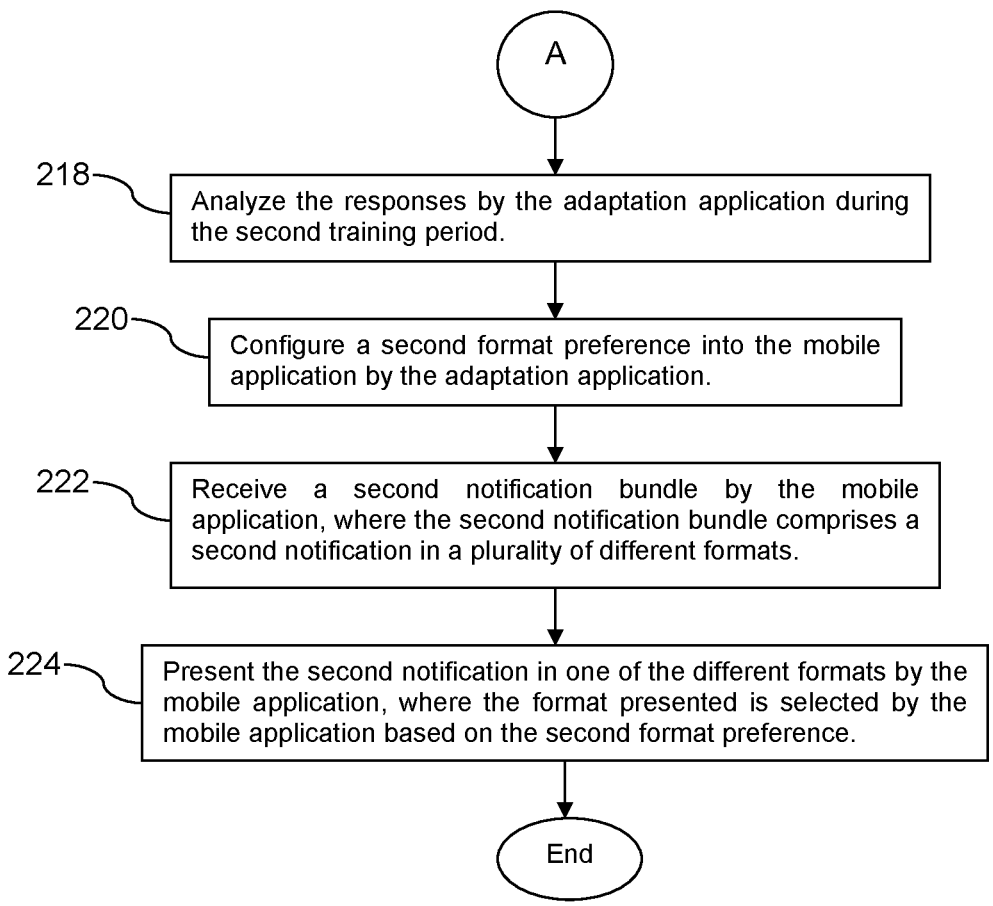

Turning now to FIG. 2A and FIG. 2B, a method 200 is described. At block 202, a mobile application executing on a mobile communication device presents notifications, where the notifications are presented in a plurality of different formats during a first training period. At block 204, a notification presentation format adaptation application executing on the mobile communication device monitors responses to presentation of the notifications during the first training period, for example capturing the responses. Alternatively, instructions in the mobile application capture the responses of a user to presentation of the notifications. Either the adaptation application or the mobile application may store the responses to presentation of the notifications in a log on the mobile communication device, for example in the response history 118 described above. At block 206, the adaptation application analyzes the responses during the first training period.

At block 208, the adaptation application configures a first format preference into the mobile application. At block 210, the mobile application receives a first notification bundle, where the first notification bundle comprises a first notification in a plurality of different formats. At block 212, the mobile application presents the first notification in one of the different formats, where the format presented is selected by the mobile application based on the first format preference. In an embodiment, the adaptation application may transmit the logs and/or statistical results developed by the adaptation application to the information sharing server 120 and/or to the user response data store 124.

At block 214, the mobile application presents notifications, where the notifications are presented in a plurality of different formats during a second training period. At block 216, the adaptation application monitors responses to presentation of the notifications during the second training period. At block 218, the adaptation application analyzes the responses during the second training period. At block 220, the adaptation application configures a second format preference into the mobile application.

At block 222, the mobile application receives a second notification bundle, where the second notification bundle comprises a second notification in a plurality of different formats. At block 224, the mobile application presents the second notification in one of the different formats, where the format presented is selected by the mobile application based on the second format preference.

Figure 3:
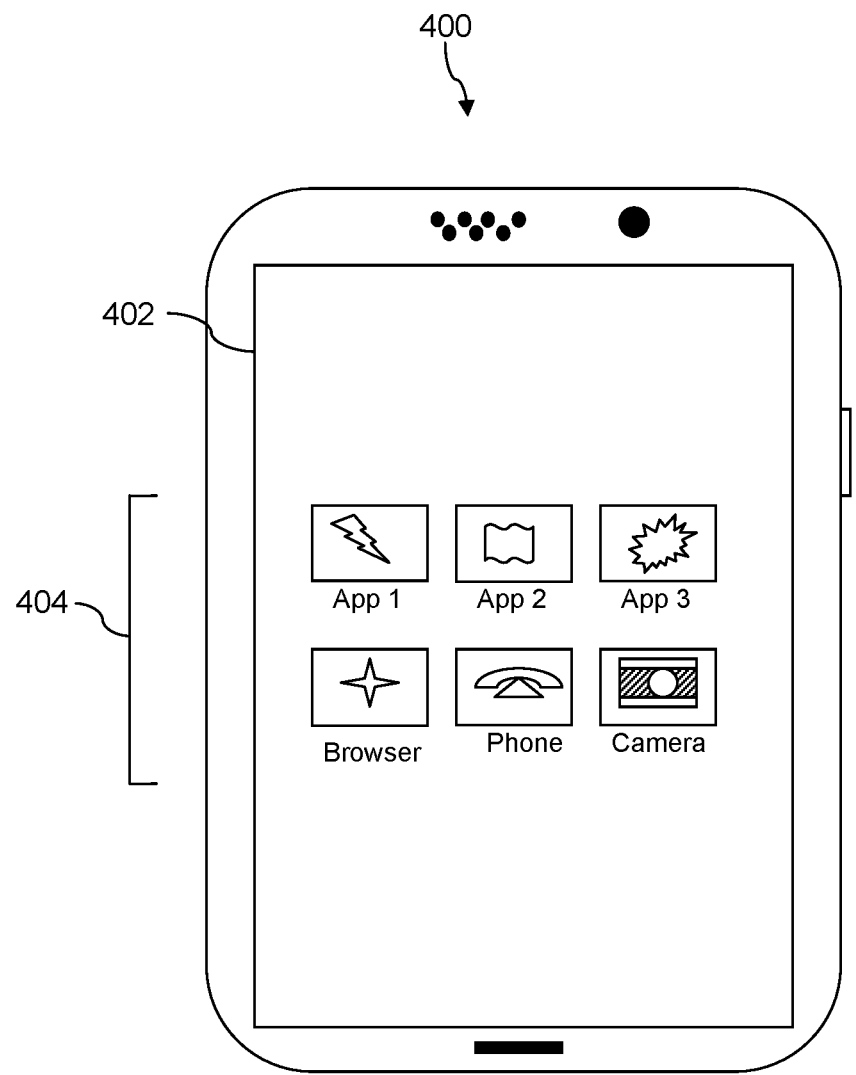
FIG. 3 is an illustration of a mobile communication device according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
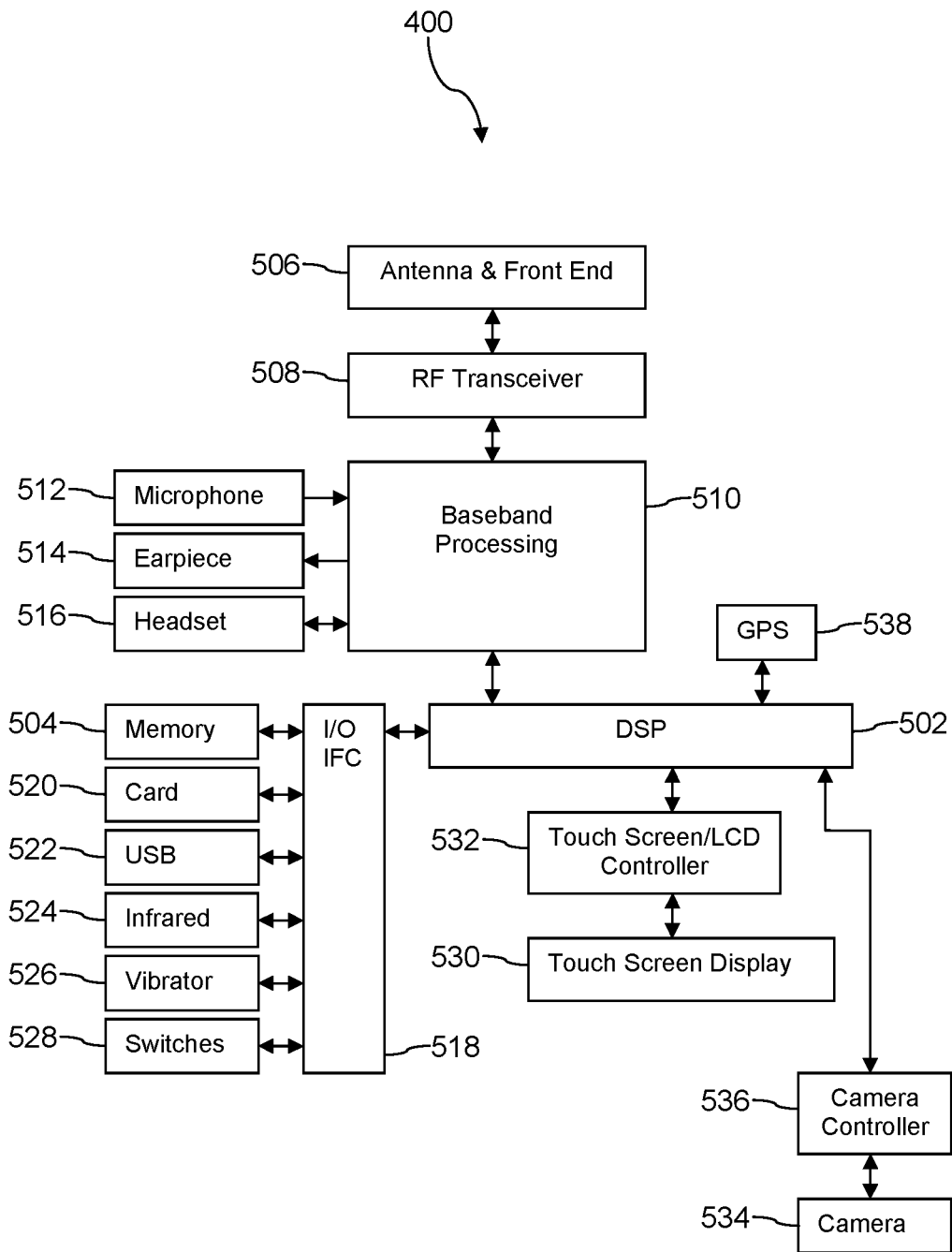
FIG. 4 is a block diagram of a hardware architecture of a mobile communication device according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
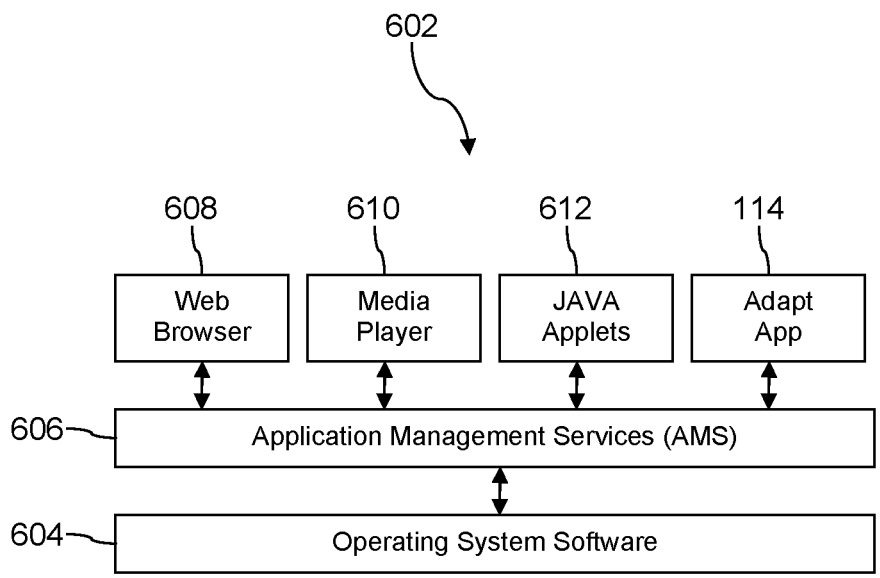
FIG. 5A is a block diagram of a software architecture of a mobile communication device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610 and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality. The notification format adaptation application 114 may be considered to part of the application layer of the software environment 602.

Figure 5B:
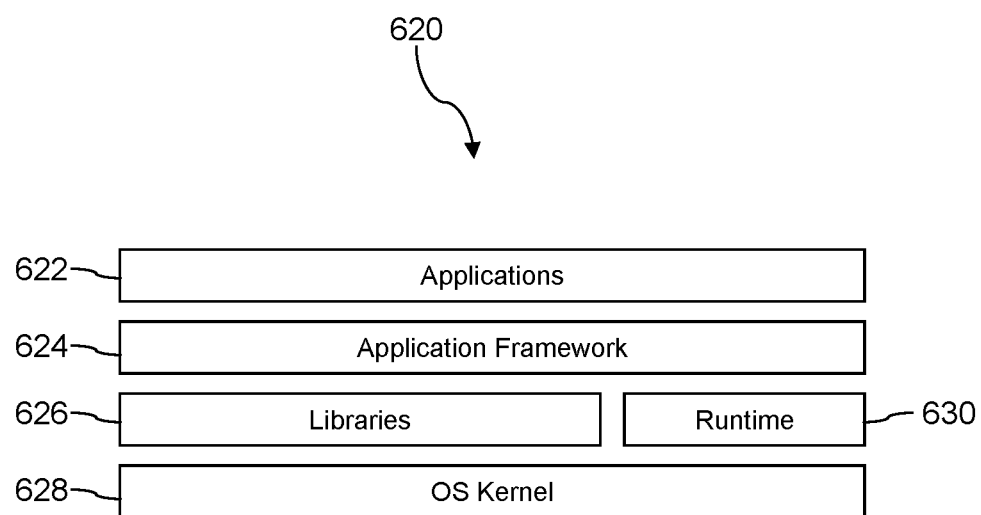
FIG. 5B is a block diagram of another software architecture of a mobile communication device according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
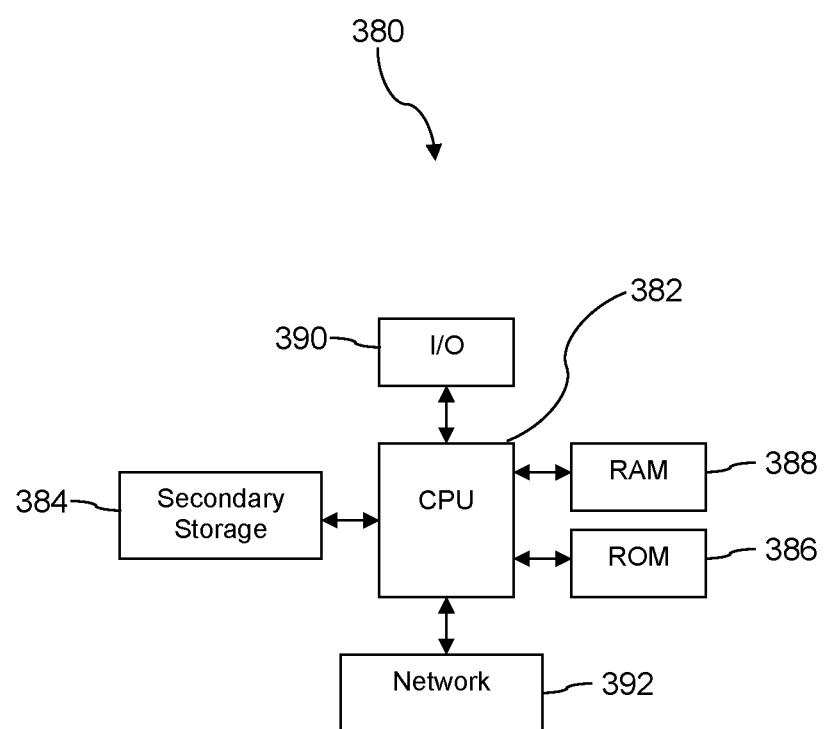
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of adapting notification presentation formats in mobile applications on mobile communication a mobile communication device, comprising:
   presenting notifications by a mobile application executing in the foreground of a user interface of a mobile communication device, where the notifications are presented in a plurality of different formats during a first training period;
   monitoring responses to presentation of the notifications during the first training period by a notification presentation format adaptation application executing on the mobile communication device;
   analyzing the responses, by the adaptation application, during the first training period to determine a format preference for presenting notifications while the mobile application is in the foreground of the user interface of the mobile communication device;
   configuring a first format preference into the mobile application by the adaptation application, wherein the format preference specifies a preference for a format of notifications presented while the mobile application is in the foreground of the user interface of the mobile communication device;
   receiving a first notification bundle by the mobile application, where the first notification bundle comprises a first notification in a plurality of different formats; and
   presenting, by the mobile application, the first notification in a format selected from the received plurality of different formats based on the format preference.

2. The method of claim 1, wherein the different formats of notifications comprise a static image format, a low-quality video format, and a high-quality video format.

3. The method of claim 1, wherein the different formats of notifications comprise a top of display format, a left-side of display format, a right-side of display format, and a bottom of display format.

4. The method of claim 1, wherein the mobile communication device is a mobile phone, a smart phone, a personal digital assistant (PDA), a wearable computer, a headset computer, a laptop computer, a tablet computer, or a notebook computer.

5. The method of claim 1, wherein a cellular radio transceiver of the mobile communication device is operable to establish a wireless communication link with a cell site according to a long term evolution (LTE), a code division multiple access (CDMA), a global system for mobile communications (GSM), or a worldwide interoperability for microwave access (WiMAX) wireless communication protocol.

6. The method of claim 1, further comprising:
   presenting additional notifications by the mobile application, where the notifications are presented in a plurality of different formats during a second training period;
   monitoring responses to presentation of the additional notifications during the second training period by the adaptation application;
   analyzing the responses by the adaptation application during the second training period to determine a changed format preference for presenting notifications while the mobile application is in the foreground of the user interface of the mobile communication device;
   configuring a second format preference into the mobile application by the adaptation application, wherein the changed format preference specifies a preference for a format of notifications presented while the mobile application is in the foreground of the user interface of the mobile communication device;
   receiving a second notification bundle by the mobile application, where the second notification bundle comprises a second notification in a plurality of different formats; and
   presenting the second notification in a format selected from the received plurality of different formats based on the changed format preference.

7. The method of claim 1, further comprising storing the responses to presentation of the notifications during the first training period in a user history database and reading the responses out of the user history database before analyzing the responses.

8. The method of claim 1, further comprising transmitting information about the responses to presentation of the notifications during the first training period to a server computer, whereby an application when executed on the server computer aggregates logs of responses to different formats of notifications from a plurality of mobile communication devices for use by third parties associated with the notifications.

9. The method of claim 1, wherein the adaptation application configures the mobile application to operate in a training mode of operation during the first training period and configures the mobile application to operate in a normal operation mode after the first training period and before a subsequent training period.

10. The method of claim 9, wherein the adaptation application configures the mobile application to operate in the training mode of operation on a periodic basis.

11. The method of claim 9, wherein the adaptation application configures the mobile application to operate in the training mode after a predefined number of notifications are presented by the mobile application since a previous operation in the training mode by the mobile application.

* * * * *